United States Patent
McGuigan

(10) Patent No.: US 8,406,523 B1
(45) Date of Patent: Mar. 26, 2013

(54) SYSTEM, METHOD AND COMPUTER PROGRAM PRODUCT FOR DETECTING UNWANTED DATA USING A RENDERED FORMAT

(75) Inventor: Mark McGuigan, Stanmore (GB)

(73) Assignee: McAfee, Inc., Santa Clara, CA (US)

( * ) Notice: Subject to any disclaimer, the term of this patent is extended or adjusted under 35 U.S.C. 154(b) by 250 days.

(21) Appl. No.: 11/297,628

(22) Filed: Dec. 7, 2005

(51) Int. Cl.
- G06K 9/00 (2006.01)
- G06K 9/62 (2006.01)
- G06K 9/34 (2006.01)

(52) U.S. Cl. .................. 382/182; 382/161; 382/176

(58) Field of Classification Search .......... 382/155–161, 382/176, 182
See application file for complete search history.

(56) References Cited

U.S. PATENT DOCUMENTS

| | | |
|---|---|---|
| 5,182,778 A | 1/1993 | Rudak et al. |
| 5,949,964 A | 9/1999 | Clouthier et al. |
| 5,987,221 A | 11/1999 | Bearss et al. |
| 5,987,610 A | 11/1999 | Franczek et al. |
| 6,073,142 A | 6/2000 | Geiger et al. |
| 6,460,050 B1 | 10/2002 | Pace et al. |
| 6,769,016 B2 | 7/2004 | Rothwell et al. ............... 709/206 |
| 7,506,155 B1 | 3/2009 | Stewart et al. |
| 7,546,334 B2 | 6/2009 | Redlich et al. |
| 7,930,353 B2 * | 4/2011 | Chickering et al. ........... 709/206 |
| 2005/0060295 A1 | 3/2005 | Gould et al. ....................... 707/3 |
| 2005/0216564 A1 * | 9/2005 | Myers et al. ................... 709/206 |
| 2012/0201458 A1 | 8/2012 | Narayanan |

OTHER PUBLICATIONS

Vision Research, MIT CSAIL Projects, http://groups.csail.mit.edu/vision/projects/index.php.
Brian Ripley's Home Page, http://www.stats.ox.ac.uk/~ripley/.
Computer Vision & Robotics, University of Cambridge Department of Engineering, http://mi.eng.cam.ac.uk/research/vision/research.html.
Artificial Intelligence @ Bristol, http://www.enm.bris.ac.uk/ai/index.html.
Dr. Evor Hines—Research Interests, http://www2.warwick.ac.uk/fac/sci/eng/staff/elh/research/.
Frederic, "Text Mining Applied to SPAM Detection," University of Geneva, Jan. 24, 2007.

(Continued)

Primary Examiner — Wesley Tucker
(74) Attorney, Agent, or Firm — Patent Capital Group

(57) ABSTRACT

A system, method and computer program product are provided for detecting unwanted data. In use, data is rendered, after which it may be determined whether the rendered data is unwanted, utilizing either a neural network or optical character recognition.

19 Claims, 5 Drawing Sheets

OTHER PUBLICATIONS

Fumera et al., "Spam Filtering Based on the Analysis of Text Information Embedded Into Images," Journal of Machine Learning Research 7, pp. 2699-2720, 2006.

Garretson, "SonicWall targets image-based spam with upgraded e-mail security offerings," Network World, Sep. 18, 2006.

U.S. Appl. No. 12/102,566, filed Apr. 14, 2008, entitled "System, Method, and Computer Program Product for Determining Whether Text Within an Image Includes Unwanted Data, utilizing a Matrix," Inventor Udhayakumar Lakshmi.

USPTO Jun. 20, 2011 Nonfinal Office Action from U.S. Appl. No. 12/102,566.

USPTO Sep. 20, 2011 Response to Jun. 20, 2011 Nonfinal Office Action from U.S. Appl. No. 12/102,566.

USPTO Jan. 20, 2012 Final Office Action from U.S. Appl. No. 12/102,566.

USPTO Mar. 15, 2012 After Final Response to Jan. 20, 2012 Final Office Action from U.S. Appl. No. 12/102,566.

USPTO Mar. 30, 2012 Notice of Allowance from U.S. Appl. No. 12/102,566.

U.S. Appl. No. 13/447,845, filed Apr. 16, 2012, entitled "System, Method, and Computer Program Product for Determining Whether Text Within an Image Includes Unwanted Data, Utilizing a Matrix," Inventor Udhayakumar Lakshmi Narayanan.

\* cited by examiner ent. Such figure illustrates a typical hardware configuration
SYSTEM, METHOD AND COMPUTER PROGRAM PRODUCT FOR DETECTING UNWANTED DATA USING A RENDERED FORMAT

FIELD OF THE INVENTION

The present invention relates to unwanted data, and more particularly to identifying and managing unwanted data.

BACKGROUND

With the advent of general access computer networks, such as the Internet, people may now easily exchange application data between computer systems. Unfortunately, some people have taken advantage of such easy data exchange by proliferating unwanted data. Non-exhaustive examples of unwanted data include unwanted electronic messages (i.e. SPAM, etc.), pornographic material, etc.

In the context of unwanted electronic messages, traditional algorithms have used word groupings and/or electronic message header information in combination with various Bayesian logic to drive a determination as to whether an electronic message is unwanted. Unfortunately, generators of unwanted electronic messages have developed techniques for overcoming such technology.

For example, legitimate-appearing text is sometimes included in the electronic message in a near white color on a white background. Further, dynamic hypertext markup language (DHTML) is used to place an unwanted message on top of such legitimate-appearing text in a readable color. To this end, the legitimate-appearing text serves to distract or circumvent the aforementioned detection technology. Still yet, the unwanted message may not even include text, and instead include a picture which is difficult to detect.

Another example of technology developed to circumvent unwanted data detectors involves the use of small words in a small font to "draw" the unwanted message in text. See, for example, Table 1 below.

TABLE 1

| hi | hi | how |
| hi hi | hi | I |
| hi | hi | how |

While the example in Table 1 is simplified, it is readily apparent that the actual unwanted message can only be read by a human and is thus difficult to detect by automated mechanisms.

In the foregoing cases, an unwanted data detector is unfortunately limited to blocking based on email header information, etc. There is thus a need for overcoming these and/or other problems associated with the prior art.

SUMMARY

A system, method and computer program product are provided for detecting unwanted data. In use, data is rendered, after which it may be determined whether the rendered data is unwanted, utilizing either a neural network or optical character recognition.

DETAILED DESCRIPTION

Figure 1:
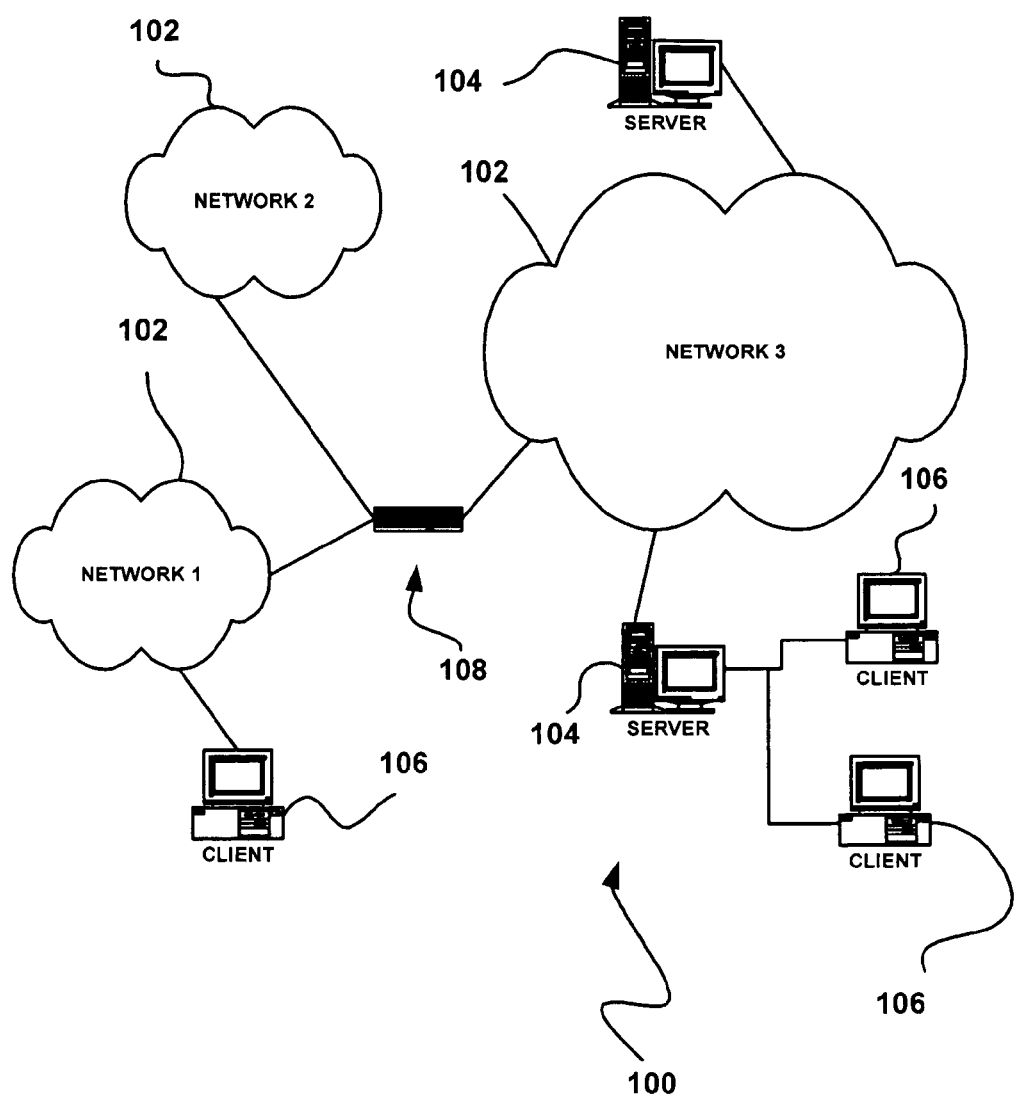
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

It should be noted that any of the foregoing computers in the present network architecture 100 may be equipped with a system, method and computer program product for detecting unwanted data, for reasons that will become apparent.

Figure 2:
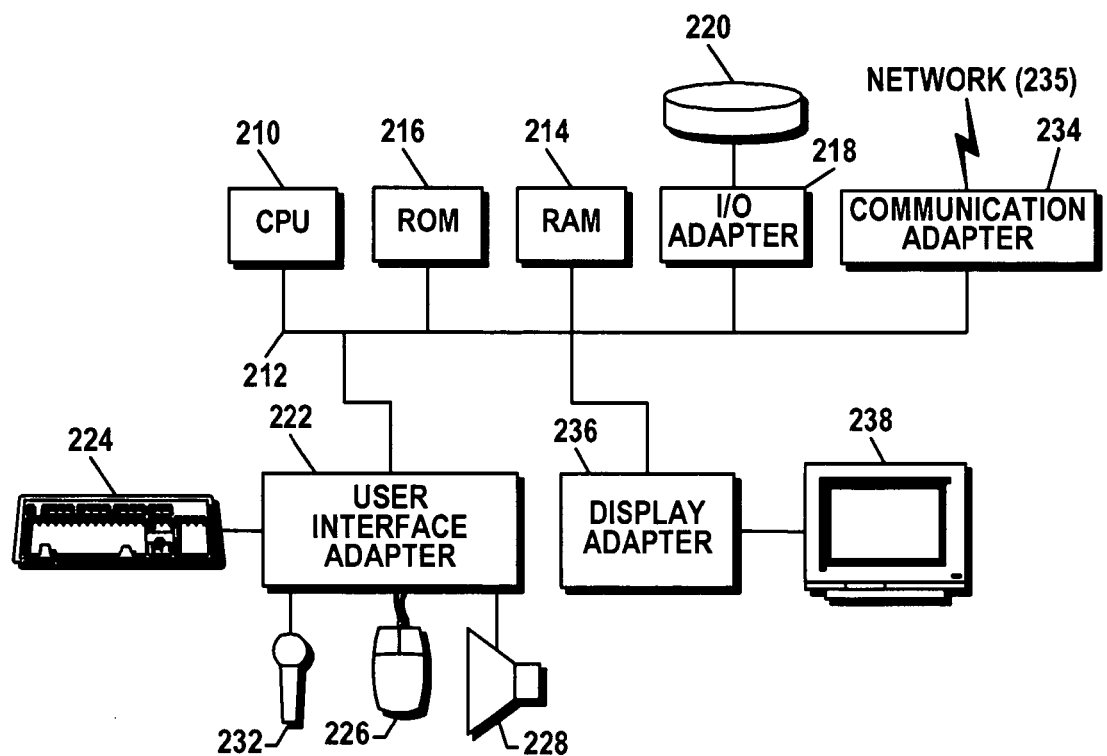
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
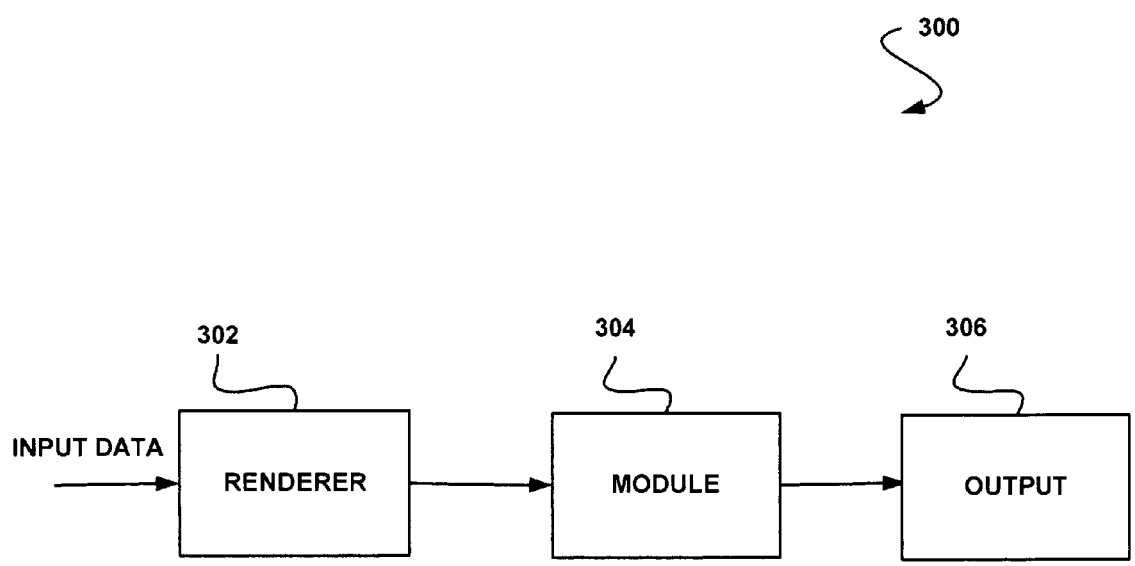
FIG. 3 shows a framework for detecting unwanted data, in accordance with one embodiment.

FIG. 3 shows a framework 300 for detecting unwanted data, in accordance with one embodiment. As an option, the present framework 300 may be implemented in the context of the architecture and environment of FIGS. 1 and/or 2. Of course, however, the framework 300 may be carried out in any desired environment.

As shown, the framework 300 includes a renderer 302. In use, the renderer 302 is adapted for rendering received data. Such data may include electronic messages [e.g. received via a simple mail transfer protocol (SMTP), other messaging protocols, etc.], content (e.g. web content, etc.), and/or any other data capable of being received via a network (e.g. see, for example, the networks 102 of FIG. 1, etc.). Still yet, the rendering may include any technique for converting the data into a graphical format which may include, but is not limited to PICT, GIF, TIFF, PNG, EPS, BMP, PCX, JPEG, screenshots, images, and/or any other format that is graphical in nature.

Further included is a module 304 in communication with the renderer 302. Such module 304, in general, is capable of detecting or being used to detect indicators that are indicative of the fact that the data may be unwanted or not. For example, in the context of an embodiment where the data is content, the indicators may indicate that the data includes vulgar or pornographic material, which is deemed to be unwanted. Further, in the context of an embodiment where the data includes an electronic message, the indicators may indicate that the data includes unsolicited material (e.g. SPAM, etc.), which is also deemed to be unwanted.

Of course, these examples are not to be deemed limiting in any way, since any sort of indicators may be detected which are indicative of the fact that the data is wanted or unwanted. Two illustrative examples of modules 304 that meet the foregoing definition will be set forth hereinafter in greater detail.

Still yet, an output operator 306 is provided which remains in communication with the module 304. In use, the output operator 306 processes the output of the module 304 for determining and/or indicating whether such output sufficiently correlates with unwanted data.

In one embodiment, the module 304 may take the form of an optical character recognition (OCR) engine. In such embodiment, such OCR engine recognizes and outputs visual characters recognized from the rendered data. For example, such may involve the analysis of the graphically formatted data, and then translation of such data into character codes (e.g. ASCII, Rich Text, etc.) commonly used in data processing.

During OCR processing, according to one embodiment, the graphically formatted data may be analyzed for light and dark areas in order to identify each alphabetic letter or numeric digit. When such a character is recognized, it is converted into a corresponding character code. Strictly as an option, specially adapted circuit boards and computer chips may be utilized to speed up such recognition process.

In the present exemplary embodiment involving an OCR engine, the output operator 306 may analyze the recognized characters in order to interpret various indicators as being unwanted. For example, text may be identified which is already known to be associated with unwanted data, heuristics associated with the text may be identified which indicate a high likelihood that the data is unwanted, etc. Based on a number, degree, threshold, etc. of such indicators, a score is output which is indicative of a likelihood that the data is unwanted.

Since the renderer and OCR engine only addresses visual text, hidden text is inherently removed from the data. To this end, it is determined whether the rendered data is unwanted by detecting indicators associated only with visual text that would be readable by a human. This may thwart any efforts by the propagator of the unwanted data to use hidden text to circumvent the operation of the output operator 306. Still yet, the OCR engine may be capable of other thwarting techniques. For example, the OCR may distinguish between small and large fonts, etc.

In another embodiment, the module 304 may take the form of a neural network. Such neural network may include a system of one or more programs and/or data structures that approximate the operation of the human brain. In use, according to one exemplary embodiment, the neural network may involve a large number of components each with a dedicated sphere of knowledge and access to data from memory.

As an option, the neural network may be initially "trained" or fed large amounts of data and/or rules about data relationships. For example, such data and/or rules may relate to the manner in which certain indictors (e.g. patterns, parameters, etc.) associated with the graphically formatted data are indicative of the same being unwanted. In making such determination, the neural network may use one or more various techniques including, but not limited to gradient-based training, fuzzy logic, genetic algorithms, Bayesian algorithms, etc. In one exemplary embodiment, the neural network may include a plurality of knowledge layers, with, in general, more complex networks having deeper layers, etc.

Utilizing the neural network, a percentage is output which is indicative of an amount of correlation between known unwanted indicators and the graphically formatted data at hand. In the context of the present description where the module 304 includes a neural network, the output module 306 may be adapted for translating such percentage into an indication as to whether the data is unwanted or not. This may be based on a threshold or any other desired algorithm. More exemplary information regarding the manner in which the neural network is adapted to process the graphically formatted data for the purpose of detecting unwanted data will be set forth during the description of FIG. 5.

While not shown, any one or more of the foregoing modules may be implemented on one or more computers (e.g. see, for example, the client computers 106 and/or server computers 104 of FIG. 1, etc.) each including one more processors.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
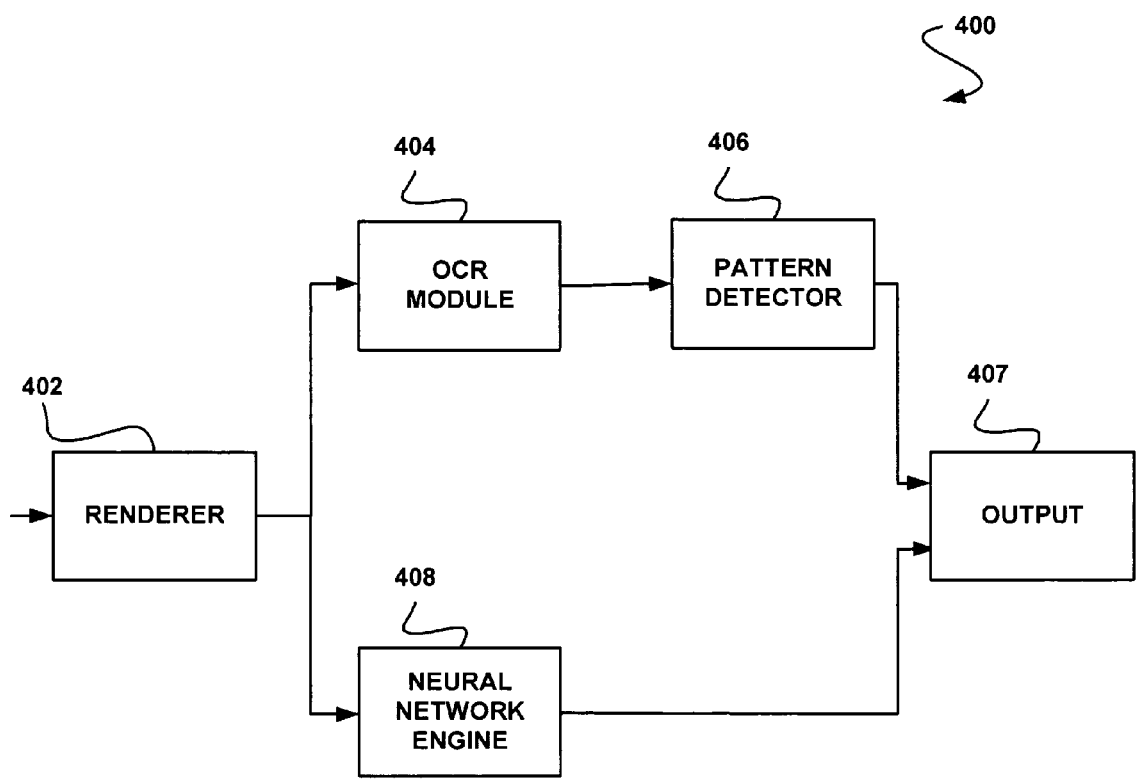
FIG. 4 shows another framework for detecting unwanted data, in accordance with one embodiment.

FIG. 4 shows another framework 400 for detecting unwanted data, in accordance with one embodiment. As an option, the present framework 400 may be implemented in the context of the architecture and environment of FIGS. 1 and/or 2. Of course, however, the framework 400 may be carried out in any desired environment. Further, the definitions set forth hereinabove may equally apply to the present description.

Similar to the framework 300 of FIG. 3, the framework 400 includes a renderer 402. However, as shown, both an OCR engine pipeline and a neural network pipeline operate in parallel. Of course, series operation of such pipelines is also contemplated.

As shown, the aforementioned OCR engine pipeline includes both an OCR engine 404 that operates as described above to recognize characters, as well as a pattern detector 406. Such pattern detector 406 may analyze the recognized characters in order to interpret various indicators as being unwanted. For example, text may be identified which is already known to be associated with unwanted data, heuristics associated with the text may be identified which indicate a high likelihood that the data is unwanted, etc. Based on a number, degree, threshold, etc. of such indicators, a score is output which is indicative of a likelihood that the data is unwanted. One optional example of such pattern detector 406 may include the McAfee® Anti-Spam Engine.

Still yet, the neural network pipeline may include a neural network engine 408 which operates as set forth hereinabove during the description of FIG. 3. Specifically, a percentage is output which is indicative of an amount of correlation between known unwanted indicators and the graphically formatted data at hand. Again, more exemplary information regarding the manner in which the neural network is adapted to process the graphically formatted data for the purpose of detecting unwanted data will be set forth during the description of FIG. 5.

Next provided is an output module 407 that is capable of receiving the score(s) from the OCR pipeline and the percentage from the neural network pipeline, for use together in acting on data as being unwanted based on both parameters. While not shown, a graphical user interface is contemplated whereby a first threshold is set for the score (e.g. using a slider bar or the like, etc.), and a second threshold is set for the percentage (e.g. again, using a slider bar or the like, etc.). Thus, upon either or both of the thresholds being surpassed, action may be taken with respect to the data as being unwanted.

Of course, in lieu of the above-described embodiment, a more complex algorithm may be used which is a function of both the score and percentage. For example, a single threshold may thereby be utilized.

After it is determined whether the threshold is surpassed and/or any other calculation indicates that data is unwanted, any desired action may be taken. For example, in the context of an embodiment where the data is content, the content may simply be blocked from a display and/or audio mechanism, and even possibly reported as known unwanted data. Further, in the context of an embodiment where the data includes an electronic message, the action may involve quarantining the message and/or, again, reporting the same for training purposes, etc. In any case, the action may be manual and/or automated, as well as passive and/or active.

Figure 5:
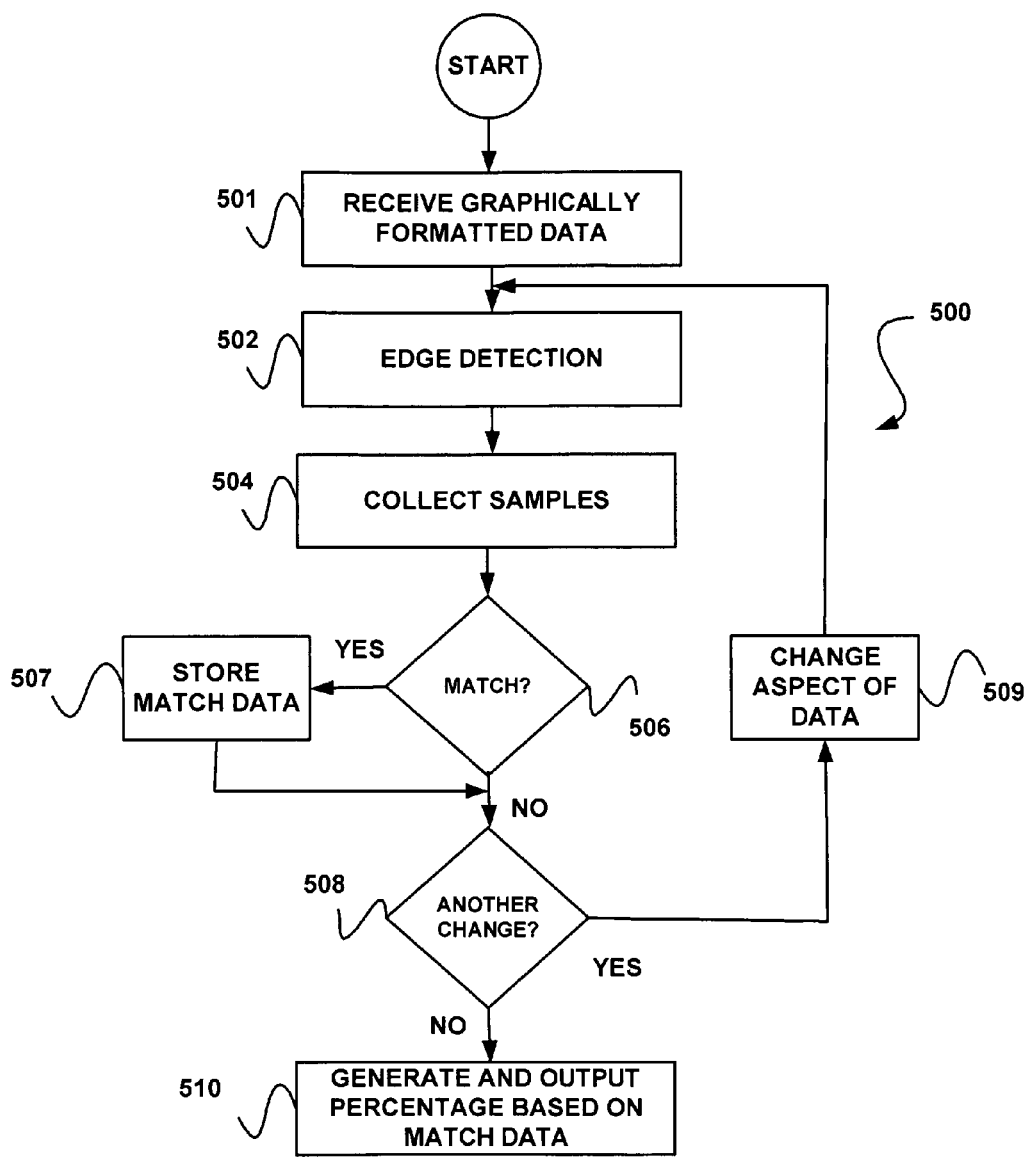
FIG. 5 shows a method for detecting unwanted data, in accordance with one embodiment.

FIG. 5 shows a method 500 for detecting unwanted data, in accordance with one embodiment. As an option, the present method 500 may be implemented in the context of the architecture and environment of FIGS. 1 and/or 2, and, in particular, in the context of the neural networks disclosed during the description of FIGS. 3-4. Of course, however, the method 500 may be carried out in any desired environment. Again, the definitions set forth hereinabove may equally apply to the present description.

As shown, graphically formatted data is received in operation 501 from a renderer, for example. Next, an edge detection operation 502 is carried out to identify one or more objects. Such edge detection may serve to mark points in the graphically formatted data in which an intensity or any other pertinent property changes. Such points may, in turn, define the one or more object.

Next, samples of such object are collected in operation 504. Such samples may be taken within the edges detected in operation 502 and may further include one or more parameters. These parameters may include, but are not limited to color, shape, depth, tone, and/or any other parameter capable of being used to detect unwanted data.

Thereafter, such samples and/or parameters are compared against samples and/or parameters known to be indicators of unwanted data to certain degrees and/or with some level of certainty. If any such match is made per decision 506 data associated with such match (e.g. a percentage of certainty, etc.) is stored in operation 507.

In decision 508, it is next determined whether a change is desired with respect to the graphically formatted data. If so, such change is performed in operation 509. Such change may include a change is resolution, a change in depth, a change in an area of the graphically formatted data (e.g. image, etc.) that is to be analyzed, and/or any other change that may lead to additional matches. After operation 509, the method 500 may continue by iterating through operations 502-507 until no further iterations are desired per decision 508.

In operation 510, a score is output based on the stored match data. If more than one set of match data is stored, such data may be summed, averaged, and/or otherwise analyzed to generate the aforementioned score. To this end, such score may be used solely or in combination with other techniques to provide an indication that the data is unwanted such that appropriate action, if any, may be initiated.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
   receiving data including human-readable visual text and hidden text, wherein the hidden text is text included in the data that is not human-readable;
   rendering the data including converting the data into graphically formatted data, wherein the visual text is retained within the rendered data and the hidden text is removed from the rendered data by the rendering by converting the hidden text into a graphically formatted representation of the hidden text such that the hidden text is not recognizable by optical character recognition of the graphically formatted representation of the hidden text; and
   determining whether the visual text within the rendered data is unwanted.

2. The method of claim 1, wherein the data includes an electronic message.

3. The method of claim 1, wherein the data includes content.

4. The method of claim 1, wherein the data is received utilizing a network.

5. The method of claim 1, wherein a graphical format of the graphically formatted data is selected from the group consisting of PICT, GIF, TIFF, PNG, EPS, BMP, PCX, and JPEG.

6. The method of claim 1, wherein it is determined whether the rendered data is unwanted, utilizing optical character recognition.

7. The method of claim 6, wherein the optical character recognition outputs visual text recognized from the rendered data.

8. The method of claim 7, wherein it is determined whether the rendered data is unwanted by detecting indicators associated with the visual text.

9. The method of claim 8, wherein a score is output based on the detected indicators.

10. The method of claim 1, wherein it is determined whether the rendered data is unwanted, utilizing a neural network.

11. The method of claim 10, wherein it is determined whether the rendered data is unwanted by performing an edge-detection operation.

12. The method of claim 11, wherein the edge-detection operation identifies at least one object.

13. The method of claim 12, wherein the neural network samples parameters of the at least one object.

14. The method of claim 13, wherein the parameters are selected from the group consisting of color, shape, depth, and tone.

15. The method of claim 13, wherein it is determined whether the rendered data is unwanted by detecting indicators associated with the samples.

16. The method of claim 15, wherein a percentage is output based on the detected indicators.

17. A computer program product embodied on a computer readable medium, comprising:

computer code for receiving data including human-readable visual text and hidden text, wherein the hidden text is text included in the data that is not human-readable;

computer code for rendering the data including converting the data into graphically formatted data, wherein the visual text is retained within the rendered data and the hidden text is removed from the rendered data by the rendering by converting the hidden text into a graphically formatted representation of the hidden text such that the hidden text is not recognizable by optical character recognition of the graphically formatted representation of the hidden text; and computer code for determining whether the visual text within the rendered data is unwanted.

18. An apparatus, comprising:

a memory element configured to store data;

a processor operable to execute instructions associated with the data;

a renderer for receiving data including human-readable visual text and hidden text, wherein the hidden text is text included in the data that is not human-readable, and rendering the data including converting the data into graphically formatted data, wherein the visual text is retained within the rendered data and the hidden text is removed from the rendered data by the rendering by converting the hidden text into a graphically formatted representation of the hidden text such that the hidden text is not recognizable by optical character recognition of the graphically formatted representation of the hidden text; and a module in communication with the renderer, the module adapted for being used in determining whether the visual text within the rendered data is unwanted.

19. The method of claim 1, wherein the rendered data is changed by changing at least one of a resolution, a depth, and an area to be analyzed.

* * * * *